UNITED STATES PATENT OFFICE.

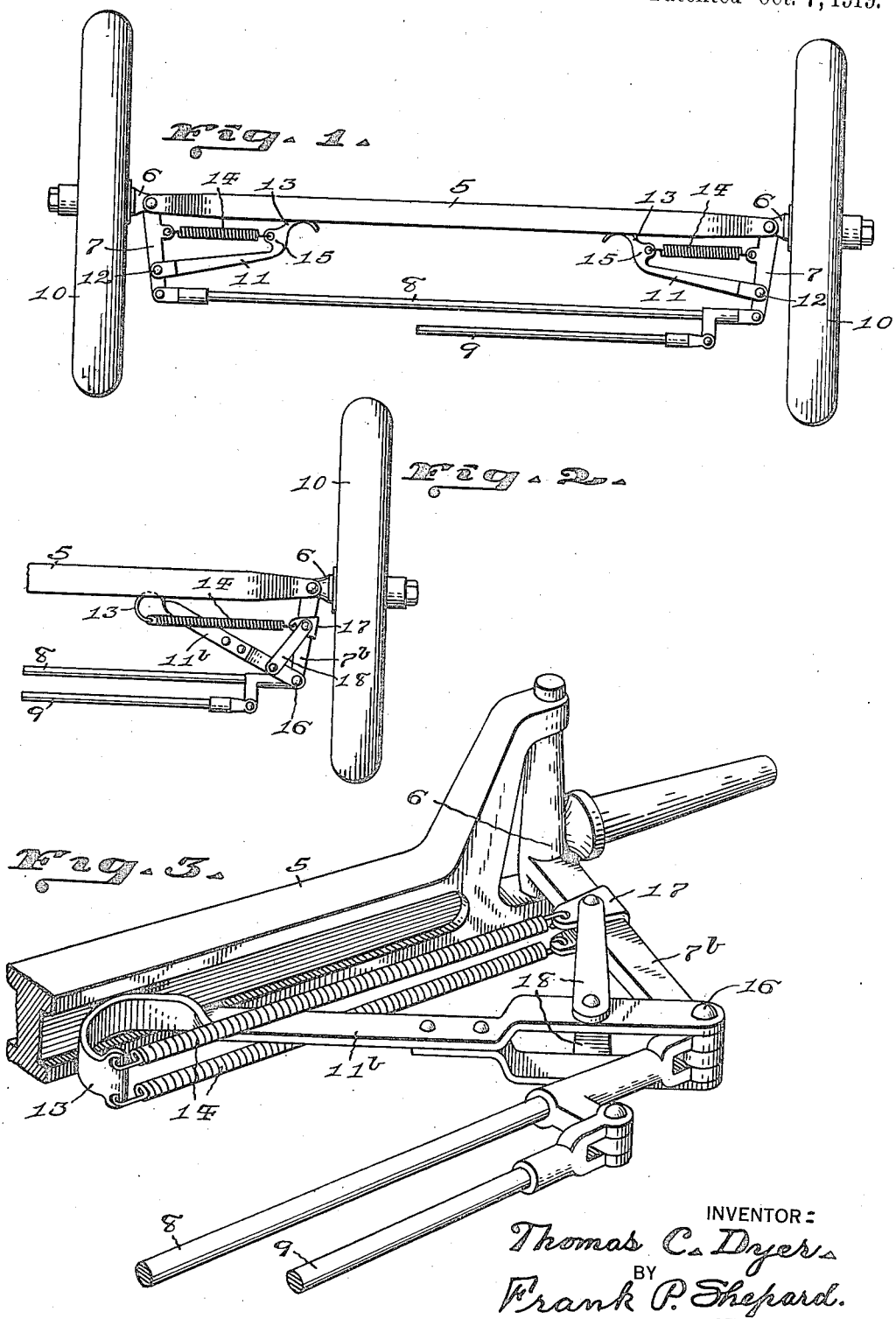

THOMAS C. DYER, OF BLANCHARD, OKLAHOMA.

STEERING-GEAR FOR AUTOMOBILES.

1,317,912.     Specification of Letters Patent.     Patented Oct. 7, 1919.

Application filed December 6, 1918. Serial No. 265,616.

*To all whom it may concern:*

Be it known that I, THOMAS C. DYER, a citizen of the United States, residing at Blanchard, in the county of McClain and State of Oklahoma, have invented certain new and useful Improvements in Steering-Gears for Automobiles, of which the following is a specification, reference being had to the accompanying drawings.

On account of the absence of screw-controlled steering gear in the "Ford" automobile, rough road requires a constant hold on the steering-wheel by the driver and often wrests it from him.

An object, therefore, of the present invention is to overcome this difficulty.

Other objects and advantages of the invention will be set forth in the ensuing description.

The drawings show one of the practical forms in which the invention may be embodied.

Figure 1 is a plan view of an automobile front axle, steering knuckles, ground wheel, and connections, and shows the application of a simple form of the invention.

Fig. 2 is a fragmental plan view showing a more developed form of the invention.

Fig. 3 is a perspective view of the parts shown in Fig. 2, with the wheel omitted.

Like characters of reference designate like parts in all the figures.

Fig. 1 shows the usual axle 5, the steering knuckles 6 which are pivoted to the axle 5, the arms 7 of the knuckles 6, the rod 8 which commonly connects the arms 7, the steering rod 9 which forms a part of the operative connection between the rod 8 and the steering-wheel (not shown), and the wheels 10 which are journaled in the usual way on the knuckles 6.

In carrying out the objects stated, the inventor associates with the pivoted knuckles 6 some suitable means for producing frictional resistance to their steering movement.

In providing this frictional means in the simpler form of the invention shown in Fig. 1, a bar 11 is pivoted to an outer portion of the arm 7 of each knuckle 6 as at 12, and the free end 13 of said bar is rested slidably against the axle 5.

A tension spring 14 has one of its ends attached to the free end of the bar 11 as at 15, and its opposite end to some other suitable part of the mechanism, for example to the arm 7 at a point not too close to the pivotal connection 12 of the arm and bar; and this spring causes the free end 13 of the bar to frictionally engage the axle 5 and thereby yieldably resist movement of the arm 7.

Since the action of the spring 14 causes the bar 11 to tend to swing the arm 7 outward, it is essential that both the right and left arms 7 be equipped with the bar 11 and spring 14, so as to balance each other and not bias the steering of the vehicle in either direction.

Since the attachment of the bar 11 and spring 14 to the arm 7 in the manner described might require a new arm specially built, the bar 11$^b$ in the more developed form of the invention shown in Figs. 2 and 3 may have its pivotal end bifurcated to have an over-all embrace of the pivotal joint of the arm 7$^b$ and rod 8; the pivot-pin 16 at said joint pivoting said bar, arm, and rod.

A U-shaped clip 17 may be saddled onto the arm 7$^b$ to attach the spring 14 to, and a pair of bars 18 may connect the clip to the pivotal end portion of the bar 11$^b$ to keep said clip from sliding out of normal position.

Since the bars 18 are not connected to a point on the bar 11$^b$ coincident with its point of pivotal connection with the arm 7$^b$, there is a sliding movement of the clip 17 on said arm at each steering movement of the parts; and since the clip is held against the arm by the spring 14 it is an added source of frictional resistance to the steering movement of the parts.

Through a long test of the improvements in actual practice the vehicle has steered easily and the steering connections have been free from chatter and jerky movements.

The following is claimed:—

1. In combination with an axle, knuckle, and knuckle arm, a member slidably engaging the axle and operatively connected to the arm, and means holding said member frictionally to the axle.

2. In combination with an axle, knuckle, and knuckle arm, a bar having one of its ends pivoted to the free end portion of the arm and its opposite end slidably engaging the axle, and a resilient connection between the arm and bar whereby the opposite end of said bar is held frictionally against said axle.

3. In combination with an axle, knuckle, and knuckle arm, a bar having one of its ends pivoted to the free end of the arm, the opposite end of the bar resting slidably against the axle, a clip mounted slidably on the arm, a tension spring connecting the clip and said opposite end of the bar, and an operative connection between the bar and clip whereby the clip is forced to slide on the arm at each steering movement of the parts.

Witness my hand this 4 day of November, 1918.

THOMAS C. DYER.